2,031,971

LIGHT CONCENTRATE METHOD AND MEANS

Filed Nov. 10, 1933

INVENTOR
William J. Morrissey
BY Ray Belmont Whitman
ATTORNEY

Patented Feb. 25, 1936

2,031,971

UNITED STATES PATENT OFFICE 2,031,971

LIGHT CONCENTRATE METHOD AND MEANS

William J. Morrissey, Brooklyn, N. Y.

Application November 10, 1933, Serial No. 697,377

10 Claims. (Cl. 88—24)

This invention relates to light concentrate systems, and more especially to such a system adapted for photographic sound recording and reproducing, although it may be used with any other type of process or structure requiring such a concentrated light optical system.

An object of the invention is to provide an improved method and means for projecting concentrated light in the form of an extremely narrow beam, having considerable intensity of illumination, upon a moving film or record carrier.

This and other objects, as are suggested or more fully set out herebelow, are attained by the method and means now to be described, and illustrated in the accompanying drawing, in which—

Figure 5:
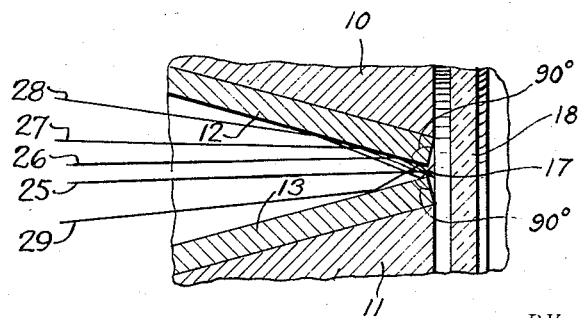

And Fig. 5 is an enlarged detail view of the right-angular ends of the inclined surface members which provide a slit aperture with the unusual feature of perfectly smooth edges.

Like numerals refer to like parts throughout the several views.

There are two types of optical sound-tube systems in general use, one with a mechanical slit mask, and the other with an optical slit.

Several patents have been granted utilizing an optical slit wherein a cylindrical rod or a glass wedge has been utilized. The chief advantage of the optical slit type is the non-fouling of the light aperture slit.

The mechanical mask slit type of optical sound tube system has several disadvantages, as follows: The greater portion of the light being masked off, the light image efficiency is exceedingly low for a narrow aperture slit; the narrow slit fouls quickly and causes unequal illumination. And the quality of the light through the narrow slit is affected by the slit aperture.

The optical slit of the cylindrical rod construction has many disadvantages, such as the fact that it cannot be made small enough, and the concentration of light upon the small diameter causes the straight lines of the glass to become very pronounced. Also, it is subject to considerable aperture distortion.

The optical slit of a pyramidal or glass wedge construction would at first glance appear satisfactory, but, if all factors be carefully considered, it is found to possess many disadvantages. In the first place, to obtain any satisfactory results from the wedge it is necessary to keep the angle of the wedge very narrow, or acute. There are several reasons for this—first, the angle of reflection of light on the plano-faces of the prism must be kept below the critical angle; this requires the use of a glass wedge which, for a very narrow slit, becomes long in length, very expensive, and very difficult or almost impossible to construct; and the edges of th slit image become very ragged and irregular. Again, if the plano-faces of the wedge be painted black, as disclosed in several patents, and if consideration is given to the light reflected, then the entire assembly offers no advantage in the light value of its slit image, and has the disadvantage of the mass of glass through which the light must pass, together with the refraction of light leaving the glass, or the quartz if that be used. Moreover, the narrow edge of the wedge becomes very ragged, and tests indicate that it is quite impossible to eliminate this fouling formation on a narrow-angle wedge with a small slit aperture.

The present invention has been perfected so as to combine all the advantages of the glass optical slits with those of the mechanical mask slits, while at the same time improving the mechanical slit of the sound optical tube assembly.

The embodiment illustrated shows a slit assembly comprising two brass backing members 10, 11 faced with inclined mirror surfaces 12, 13. These surface members 12, 13 are preferably formed of stainless steel, or like mirror composition which is non-corrosive, and which has the mirror surface on its face, and which reflects the ultra-violet rays without absorption, and has other advantages over glass or quartz.

The surface members 12 and 13 form an equal angle with the center axis of the assembly and form an angle with each other below the critical angle of the reflection.

A system of condenser lenses 14, 15 of any desired form, is shown at the entrance of the slit assembly. These are preferably recessed into their mounting tube 16, as shown in Fig. 1, to form a dirt seal.

Figure 1:
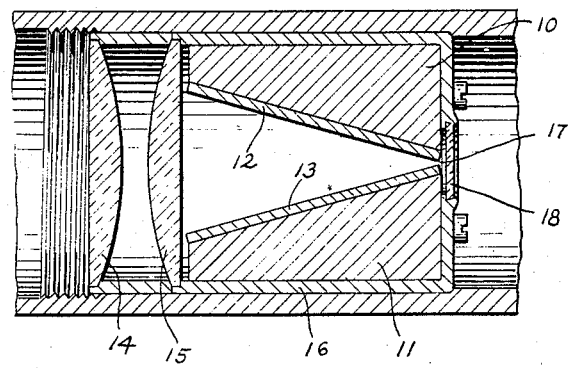
Figure 1 is a diametrical cross-sectional view of a preferred embodiment of the invention, showing the mechanical light mask with its slit aperture, two inclined surfaces, condensing or other lenses, and casing therefor.
Figure 2:
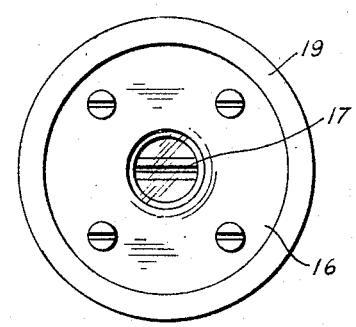
Fig. 2 is an end view of the assembly of Fig. 1, showing the slit aperture.

The mirror surface members 12, 13 are separated from each other at their other ends to form the slit aperture 17, Figs. 1 and 2, and this is preferably protected by a thin plano-glass or quartz cover 18 to serve as a dirt shield.

An outside mounting 19 houses the entire assembly, above.

Figure 3:
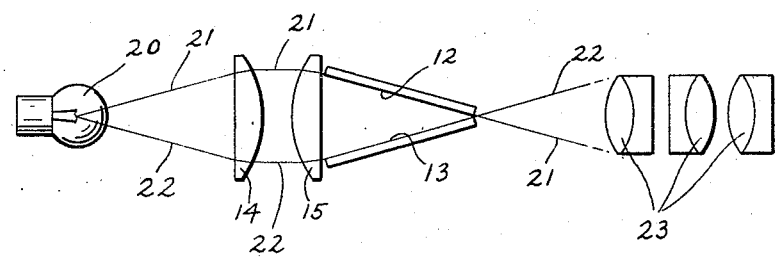
Fig. 3 is a diagrammatic view of the essential elements of the optical system of Fig. 1, including a light source, the path of light rays, and also an assemblage of objective lenses adapted for general purposes.
Figure 4:
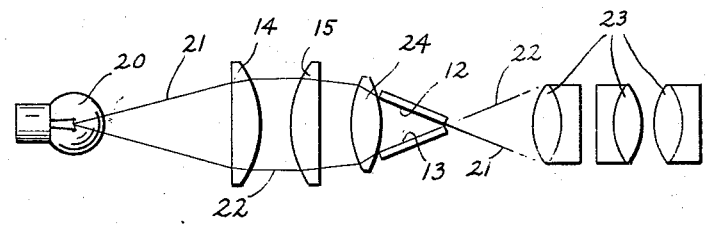
Fig. 4 is similar to Fig. 3, but includes a biconvex cylindrical lens used to shorten the needed assembly.

The optical diagrams, Figs. 3 and 4, show the light source 20, the paths 21, 22 of light rays, the condenser system 14, 15, the mirror surface members 12, 13, and an objective system of lenses 23. In addition, Fig. 4 shows a bi-convex cylindrical lens 24, used to shorten up the needed assembly.

Fig. 5 shows more clearly the feature of applicant's invention, whereby the mirror surfaces 12 and 13 have their slit aperture ends not pointed, as is usual, but with a blunt angle, either substantially 90 degrees as shown, or even an obtuse angle, this giving perfectly smooth slit aperture edges, as contrasted with the present-day ragged edges. The great advantages of this detail are self-evident.

The surfaces 12 and 13 are inclined relative to each other at an acute angle which is below the critical angle. The line 25, representing a ray of light, passes directly through the slit aperture formed by the adjacent ends of the surfaces 12 and 13. The lines 26 and 27, representing other rays of light, strike the surface 12 and are reflected therefrom directly through the slit aperture. The line 28, representing still another ray of light, strikes the surface 12 and is reflected thereby to the surface 13 and thence through the slit aperture. The line 29, representing another ray of light, strikes the surface 13 and is reflected therefrom to the surface 12 and thence through the slit aperture.

From this it can be seen that not only do some of the rays of light pass directly through the slit but others are also progressively reflected toward and through the slit aperture.

Of course, modifications in details of the above may be made, the invention covering broadly that set out in the following claims.

Having now described the invention, what is claimed as new and for which Letters Patent of the United States is desired, is:

1. In an optical scanning device, a pair of plates having flat surfaces and squared ends supported at an acute angle relative to each other with adjacent squared ends forming a slit, means for projecting some light rays directly through the slit, and means for projecting other rays onto said surfaces where, due to the angular relation of the surfaces, said last rays are progressively reflected forward to pass through said slit.

2. In an optical sound tube assembly, a pair of light reflecting members oppositely disposed forming equal angles with the center axis of said assembly and an acute angle with each other, and having adjacent ends defining a slit aperture, the surfaces of said members being adapted to progressively reflect the light rays toward and through the slit aperture along with other rays of light which pass directly through said aperture, said members having edges forming right angles with the surfaces thereof and adapted to form a sharply defined slit aperture.

3. In a device for scanning sound records, in combination, a source of light, a condensing lens for gathering light from said source, an objective lens system positioned with its center axis in line with the center axis of said condenser, a pair of metallic plates having mirrored surfaces and edges substantially square with said surfaces, means positioning said plates between said condenser and said objective system with each surface inclined to and forming an equal angle with said axis and an angle below the critical angle of reflection with each other, the adjacent squared ends of said plates forming a slit aperture through which some light from said condenser may pass, said surfaces adapted to progressively reflect light falling thereon from said condenser toward and through said slit aperture, thereby sizing and defining a highly concentrated beam of light and passing the same to said objective system.

4. A device for scanning sound records, in combination, a source of light, condenser for gathering light from said source, an objective lens system in line with and spaced apart from said condenser, a pair of metallic plates having mirrored surfaces and edges forming right angles with said surfaces, and means supporting said plates between said condenser and said objective lens system and in angular relation to each other below the critical angle of reflection with adjacent edges of said plates forming a slit aperture adjacent to said objective lens system, said slit being adapted to size and define a highly concentrated beam of light passing to said objective lens and comprised of some light passing directly through said slit and other light which is progressively reflected from one plate to the other through the medium of air between said plates.

5. The invention according to claim 3 in which a thin plano-glass or quartz cover is positioned adjacent to the ends of said plates forming said slit to protect the slit from dirt and dust, and in which the condenser is positioned in sealed relation to the other end of the plate assembly to prevent dirt and dust from reaching the surfaces of said plates.

6. In a device of the character described, a slit forming member including a metallic cup having a closed end with a circular opening formed therein centrally located on the center axis of said cup, a pair of supporting members positioned within said cup having circular contours fitting the interior walls of said cup and plane flat faces angular with respect to the center axis of the cup and each forming an equal angle with said axis, a pair of rectangular plates having highly polished surfaces and substantially square edges, one of said plates being permanently secured to one of said supporting members and the other being permanently secured to the other of said supporting members, and means for retaining said plates and supporting members in said cup with adjacent edges of said plates at the bottom of the cup forming a slit aperture.

7. In a device of the character described, a slit forming member including a metallic cup having a closed end with a circular opening formed therein centrally located on the center axis of said cup, a pair of supporting members positioned with said cup having circular contours fitting the interior walls of said cup and plane flat faces angular with respect to the center axis of the cup and each forming an equal angle with said axis, a pair of metallic plates having highly polished surfaces and substantially square edges, one of said plates being permanently secured to one of said supporting members and the other being permanently secured to the other of said supporting members, and screws for securing said supporting members and plates in said cup with adjacent edges of said plates defining two dimensions of said slit and with said circular opening forming the other two dimensions of said slit.

8. A device according to claim 7 in which the screws for securing said members in the cup pass through the ends of the cup.

9. A device according to claim 7 in which the circular opening in the bottom of the cup is provided with a plano-glass or quartz cover and in which the open end of the cup is closed with condensing lenses thereby sealing the device from dirt and dust.

10. The invention according to claim 5 in which the edges of the plates are ground to form an acute angle with the surface after which all burrs due to the grinding are removed and the surfaces and the edges are highly polished resulting in the formation of perfectly smooth slit aperture edges.

WILLIAM J. MORRISSEY.